United States Patent
Gooijer et al.

(10) Patent No.: US 9,418,272 B2
(45) Date of Patent: Aug. 16, 2016

(54) CONFIGURABLE BARCODE PROCESSING SYSTEM

(71) Applicant: Oracle International Corporation, Redwood Shores, CA (US)

(72) Inventors: Steven Irene Andre Gooijer, Maple Grove, MN (US); Charles J. Hahr, Jr., Roberts, WI (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/565,605

(22) Filed: Dec. 10, 2014

(65) Prior Publication Data

US 2016/0171269 A1    Jun. 16, 2016

(51) Int. Cl.
*G06K 7/10* (2006.01)
*G06K 7/14* (2006.01)

(52) U.S. Cl.
CPC .................... *G06K 7/1439* (2013.01)

(58) Field of Classification Search
CPC ............ G06K 7/1439; G06K 7/10544; G06K 7/10821
USPC ......... 235/375, 435, 462.01, 462.15
See application file for complete search history.

(56) References Cited

U.S. PATENT DOCUMENTS

| | | | |
|---|---|---|---|
| 7,124,948 B2* | 10/2006 | Longacre, Jr. ..... | G06K 7/10544 235/462.01 |
| 7,637,433 B1* | 12/2009 | Zhu .................... | G06K 7/10712 235/462.01 |
| 8,201,742 B2 | 6/2012 | Maeda et al. | |
| 8,356,753 B2* | 1/2013 | Chiou ................. | G06K 7/14 235/462.01 |
| 2004/0262392 A1* | 12/2004 | Longacre, Jr. ..... | G06K 7/10544 235/462.07 |
| 2005/0103846 A1* | 5/2005 | Zhu .................... | G06K 7/10732 235/462.07 |
| 2005/0263599 A1* | 12/2005 | Zhu .................... | G06K 7/10722 235/462.41 |
| 2006/0011725 A1* | 1/2006 | Schnee .............. | G06K 7/10722 235/454 |
| 2006/0208083 A1* | 9/2006 | Kotlarsky .......... | G06K 7/10881 235/462.01 |
| 2006/0219792 A1* | 10/2006 | Zhu .................... | G06F 9/44526 235/462.06 |
| 2007/0040035 A1* | 2/2007 | Kotlarsky .......... | G06K 7/10683 235/462.45 |
| 2007/0215706 A1* | 9/2007 | Kotlarsky ........... | G06F 9/44526 235/462.07 |
| 2010/0091313 A1 | 4/2010 | Kitada et al. | |
| 2011/0073651 A1* | 3/2011 | Chiou ................ | G06K 7/14 235/462.07 |
| 2011/0284625 A1* | 11/2011 | Smith ................. | G06K 7/1098 235/375 |
| 2012/0048939 A1* | 3/2012 | Fiutak ................ | G06K 7/14 235/462.15 |

* cited by examiner

*Primary Examiner* — Paultep Savusdiphol
(74) *Attorney, Agent, or Firm* — Miles & Stockbridge P.C.

(57) ABSTRACT

A barcode processing system receives barcode data obtained by scanning a barcode. The system then determines a path of a software object, processes the barcode data with the software object, and determines whether the barcode is of a barcode type that is implemented by the software object. When the barcode is not of the barcode type that is implemented by the software object, the system repeats the determining of the path, the processing of the barcode data, and the determining of whether the barcode is of the barcode type implemented by the software object.

20 Claims, 2 Drawing Sheets

CONFIGURABLE BARCODE PROCESSING SYSTEM

FIELD

One embodiment is directed generally to a computer system, and in particular, to a barcode processing computer system.

BACKGROUND INFORMATION

Generally, in telecommunications and computing, a machine-readable medium refers to a medium capable of storing data in a format readable by a device. An example of a machine-readable medium is a barcode, which is an optical machine-readable representation of data relating to the object to which it is attached. Barcodes can be processed in a barcode system. A barcode system is a network of hardware and supporting software, including mobile computers, printers, handheld scanners, and infrastructure. Barcode systems automate data collection where hand recording is not timely or cost effective. Barcode systems may be implemented within an inventory management system.

Inventory management systems perform inventory management which includes specifying quantities of stocked goods. It is required at different locations within a facility or within many locations of a supply network. The scope of inventory management includes replenishment lead time, carrying costs of inventory, asset management, inventory forecasting, inventory valuation, inventory visibility, future inventory price forecasting, physical inventory, available physical space for inventory, quality management, replenishment, returns and defective goods, and demand forecasting.

Retailers often embed product information (e.g., weight, price, expiration date, and department) inside a barcode to support special business processes. Such information may be used to determine additional information about the product bearing the barcode. For example, the weight of an item can be recorded on a sales transaction by dividing its barcode price by a corresponding unit price. As such, special algorithms may be created to process these barcodes so the application that scans the barcode can extract the item number from the barcode and kick off a special process if needed.

SUMMARY

One embodiment is a system that performs barcode processing. The system receives barcode data obtained by scanning a barcode. The system then determines a path of a software object, processes the barcode data with the software object, and determines whether the barcode is of a barcode type that is implemented by the software object. When the barcode is not of the barcode type that is implemented by the software object, the system repeats the determining of the path, the processing of the barcode data, and the determining of whether the barcode is of the barcode type implemented by the software object.

DETAILED DESCRIPTION

Embodiments provide configurable barcode processing. In one embodiment, a retailer is allowed to define an order of execution for various barcode processing algorithms. The order may be determined based on relative usage of various algorithms. The retailer can also turn off some algorithms that are not being used and/or add new custom algorithms if needed. For each algorithm, a software object is created and a path to the location of the software object is stored in a table of barcode processor candidates. When a barcode is scanned, the table is looked up to retrieve various algorithms and identify the appropriate algorithm. Accordingly, by providing the configurability of adding, deleting, and ordering various algorithms, efficient barcode processing is achieved.

Figure 1:
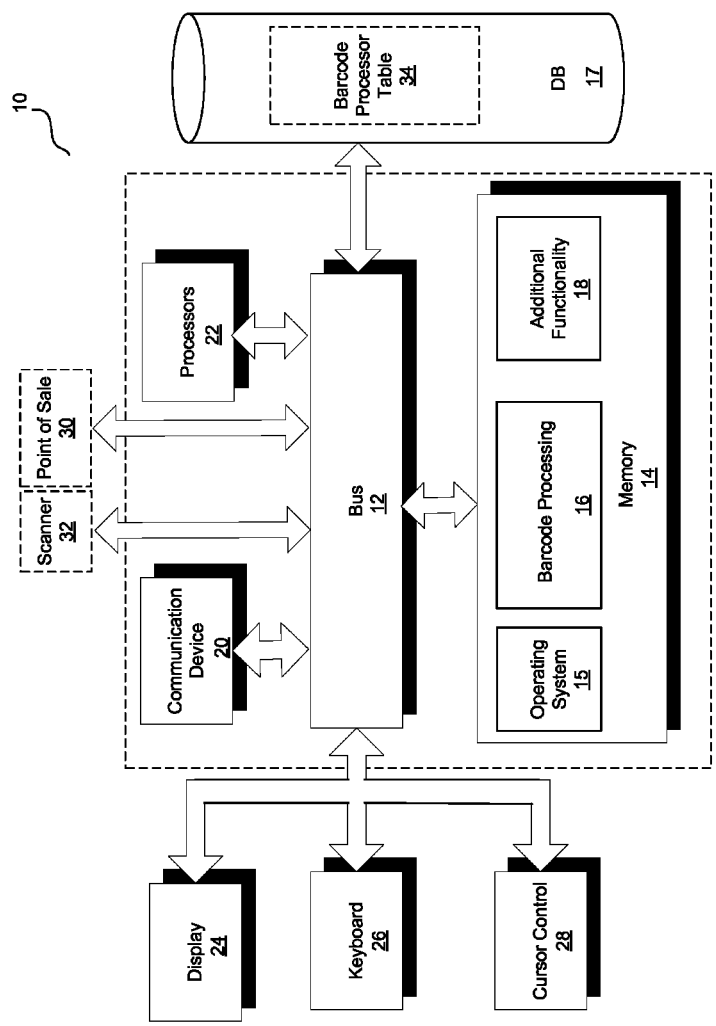
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a barcode processing module 16 for providing barcode processing, and all other functionality disclosed herein. System 10 can be part of a larger system, such as added functionality to the "Oracle Retail Store Inventory Management" from Oracle Corp. Therefore, system 10 can include one or more additional functional modules 18 to include the additional functionality. A database 17 is coupled to bus 12 to provide centralized storage for modules 16 and 18.

In one embodiment, computer system 10 may function as, or may communicate with, a point of sale ("POS") device 30 for providing barcode processing, and all other functionality disclosed herein. POS (also called checkout) is the place where a retail transaction is completed, e.g., a point at which a customer makes a payment to the merchant in exchange for goods or services. At POS, the retailer may calculate the amount owed by the customer, provide options for the customer to make payment, and also normally issue a receipt for the transaction. POS in various retail industries uses customized hardware and software as per their requirements. Retailers may utilize weighing scales, scanners, electronic and manual cash registers, electronic funds transfer at POS ("EFTPOS") terminals, touch screens, and any other wide variety of hardware and software available for use with POS. For example, a grocery or candy store may use a scale at POS, while bars and restaurants may use software to customize the item or service sold when a customer has a special meal or drink request.

In one embodiment, computer system 10 may function as, or may communicate with, a scanner 32 for providing barcode processing, and all other functionality disclosed herein. Scanner 32 may be used for scanning a barcode attached to an item so the barcode can be processed by computer system 10. In one embodiment, scanner 32 may be included within POS device 30 or within a handheld device.

In one embodiment, database 17 includes a barcode processor table 34 for providing barcode processing, and all other functionality disclosed herein. Barcode processor table 34 may include data related to various barcode processing algorithms used for processing different types of barcodes.

Generally, with some known barcode processing systems, a barcode is scanned to identify the item to which it is attached. However, there may be additional information embedded inside a barcode (e.g., weight, price, expiration date, department, etc.) that could be used to support special business processes. For example, the weight of an item may be recorded on a sales transaction by dividing its barcode price by the current unit price.

One known solution to this problem is to create one or more special barcode processing algorithms that can extract the relevant parts of a barcode, so the application that scans the barcode can extract the item number from such a barcode and kick off a special process if needed. When a barcode is scanned, the barcode processing system may look at some barcode criteria such as the length of the barcode or the start of the barcode to find out which algorithm should be used. Some known inventory management systems provide a packaged barcode processing application that is generically designed for various types of retailers with different barcode needs, and the application looks for barcode types based on such collective barcode needs and irrespective of the specific needs of the retailer for which it is deployed.

One disadvantage with these known approaches is that, when deploying packaged applications across many retail verticals, it may be inefficient to examine a large number of barcode types if only a few types are being used. In these situations, the known approaches become cumbersome since a large number of algorithms may have to be unnecessarily tested to determine an appropriate algorithm. Examples of these situations are when a packaged application is deployed in environments where barcodes are not used, or when only "type 2" barcodes (i.e., embedded price barcodes) and/or "GS1 DataBars" are used. "GS1" is an organization that develops and maintains standards for supply and demand chains across multiple sectors. Most companies use GS1 to get a barcode number for their products. GS1 DataBar is a family of symbols most commonly seen in the GS1 DataBar coupons which are barcodes often placed on grocery coupons issued by product manufacturers (i.e., manufacturer coupons).

In contrast to the known solutions, one embodiment of the present invention allows a retailer to configure which barcode algorithms to execute and change the priority of the algorithms that are executed, so that scanning response time can be optimized. Embodiments also allow the addition of custom algorithms based on the needs of a retailer. Accordingly, by allowing retailers to add their own algorithms and prioritize them together with those algorithms provided by default, embodiments improve performance and flexibility of barcode processing and reduce total cost of ownership ("TCO").

In one embodiment, barcodes are processed in an inventory management system by barcode processors. A barcode processor is an algorithm that attempts to identify an item by processing the input string obtained from scanning a barcode attached to that item. In one embodiment, each barcode processor algorithm is implemented as a software object. Software objects consist of state and related behavior. An object stores its state in fields (or variables), and exposes its behavior through methods (or functions). Methods operate on the internal state of an object and serve as the primary mechanism for object-to-object communication.

In one embodiment, in order to identify an item when its barcode is scanned, each candidate barcode type is tested by accessing the software object that implements that barcode type. Required information for identifying and accessing candidate barcode processor algorithms is stored in barcode processor table 34 in database 17 of FIG. 1. Table 34 defines what barcode processors are available, and the available barcode processor names are dynamically loaded from table 34 to determine which barcode processor should be used when searching for an item based on an input string.

Barcode processor table 34 in one embodiment includes one row for each candidate barcode processor, and includes multiple columns corresponding to various attributes of the barcode processors. Table 1 is an example description of columns in barcode processor table 34 in one embodiment.

TABLE 1

Example description of columns in a barcode processor table

| Column Name | Data Type | Nullable | Description |
| --- | --- | --- | --- |
| NAME | VARCHAR2(25) | No | Name of processor |
| DESCRIPTION | VARCHAR2(256) | Yes | Description of processor |
| FILE_NAME | VARCHAR2(256) | No | Full class path Java class name of processor |
| ACTIVE | VARCHAR2(1) | No | "Y" indicates active, "N" indicates not active |

Table 1 provides the column name, data type, and description for each column of barcode processor table 34. Table 1 further indicates whether each column of barcode processor table 34 is "Nullable" or not (i.e., can be ignored or considered "Null" or not). The "NAME" and "DESCRIPTION" columns are used to label a barcode processor record in barcode processor table 34. The "ACTIVE" column includes a "Y" or an "N" value to determine whether or not a barcode processor algorithm is being used in an inventory management system (i.e., the corresponding barcode type is being considered as a candidate when processing a barcode). The inventory management system provides several algorithms which may be marked as "ACTIVE" by default. In one embodiment, barcode processing is customized by activating or deactivating barcode processor algorithms based on usage. For example, the "ACTIVE" attribute may be changed to "N" for those algorithms that are not being used, thereby reducing the number of candidate algorithms and resulting in lower processing time.

Still referring to Table 1, the "FILE_NAME" column indicates the location of a barcode processor algorithm. For example, the "FILE_NAME" column may include the fully qualified class path to the .java file that implements a barcode processor algorithm. A class path is a path that the Java runtime environment uses to search for classes and other resource files. In object-oriented programming, a class is an extensible program-code-template for creating objects, providing initial values for state (or member variables) and implementation of behavior (or member functions/methods). The Java class that implements the barcode should be placed in the class path of the deployed server.

In one embodiment, in order to add a new barcode processor algorithm in the inventory management system to process a specific barcode type, a new barcode processor Java class is coded to implement that barcode type, and a corresponding row is inserted into barcode processor table 34 in database 17 of FIG. 1. The new Java class is placed in the class path of the deployed server. Table 2 shows attributes of an example 24 character Universal Product Code (UPC) barcode processor as stored in a row of barcode processor table 34. UPC is a type of barcode that is widely used for tracking trade items in stores.

TABLE 2

Example attributes of a 24 character UPC barcode processor

| Column Name | Data Type | Nullable | Description |
| --- | --- | --- | --- |
| NAME | VARCHAR2(25) | No | UPC-24 |
| DESCRIPTION | VARCHAR2(256) | Yes | 24 character barcode processor |
| FILE_NAME | VARCHAR2(256) | No | custom.barcode.BarcodeProcessorUPC24 |
| ACTIVE | VARCHAR2(1) | No | Y |

In one embodiment, all barcode processor Java classes implement the same interface. An interface is a group of related methods with empty bodies. When a class implements an interface, all methods defined by that interface appear in the source code of the class before it successfully compiles. In one embodiment, all barcode processor Java classes implement a "BarcodeProcessor" interface which defines several methods, and the logic of each method is implemented to satisfy the requirements of a corresponding barcode.

In one embodiment, barcode processor table 34 in database 17 of FIG. 1 further defines priorities for the execution of the barcode processor algorithms. Table 3 shows an example description of columns in barcode processor table 34, including a column that defines priorities.

TABLE 3

Example description of columns in a barcode processor table with priority

| Column | Comment |
| --- | --- |
| NAME | Name of processor |
| DESCRIPTION | Description of processor |
| FILE_NAME | Java class path name of processor |
| ACTIVE | Barcode active indicator. "Y" means active, "N" means not active. |
| PROCESS_SEQUENCE | Indicates the sequence of processors used to attempt to process barcode. |

As shown in Table 3, a "PROCESS_SEQUENCE" column in barcode processor table 34 determines the order in which candidate barcode processor algorithms are executed. Barcode processing stops at the first barcode processor algorithm that successfully parses the barcode, that is, if an algorithm successfully parses the barcode, other algorithms with lower execution priority will not be attempted. In one embodiment, in the "PROCESS_SEQUENCE" column, an algorithm corresponding to a more commonly used barcode type has a higher priority compared to an algorithm corresponding to a less commonly used barcode type. In one embodiment, any barcodes that are not being used are deactivated.

In one embodiment, the barcode processor classes are cached. Accordingly, altering barcode processor table 34 (e.g., making a barcode processor algorithm "active," or adding/deleting a row corresponding to a barcode processor algorithm) will not have an effect on the inventory management system until the server has been restarted.

In one embodiment, when a barcode type needs updated processing, barcode processor table 34 is updated by deactivating the row corresponding to the default barcode processor algorithm of such barcode type, creating a new custom barcode processor algorithm, and activating a corresponding new row in barcode processor table 34.

In one embodiment, when a new barcode processor algorithm implements the "BarcodeProcessor" interface, two methods in this interface are implemented: a first method "BarcodeRecord parseBarcodeRecord(String barcode)," and a second method "void processBarcodeItem(BarcodeItem barcodeItem, BarcodeRecord barcodeRecord) throws Exception." The input parameter of the first method is the barcode to be parsed. This method parses out the barcode and returns a BarcodeRecord object with the appropriate values filled in from the barcode. A BarcodeRecord object represents the information parsed from a barcode by a barcode processing algorithm. It carries some information about the type of the barcode as well in case the second method needs that information. Example attributes of a BarcodeRecord object are shown in Table 4. If the barcode does not match the format of the barcode processing algorithm or if any other error occurs, the first method returns "Null" indicating that no BarcodeRecord exists.

TABLE 4

Example attributes of a BarcodeRecord object

| Attribute | Description |
| --- | --- |
| itemId | Stock keeping unit ("SKU") or UPC number found in the barcode. This is required when parsing the barcode. |
| serialNumber | A serial number. This is optional and may or may not be found within the barcode. |
| type2Code | A single letter code indicating what format of type 2 the record is. This value is used to find the correct item in the data store, which must contain this format code as part of the data of the item. Current values are A->L. This attribute is optional. |
| type2Prefix | The prefix of the type 2 format. If this is a price look up ("PLU") type 2 barcode processor, then this value should be set to 2. |

TABLE 4-continued

Example attributes of a BarcodeRecord object

| Attribute | Description |
|---|---|
| type2Format | "True" if this is a type 2 barcode, "false" if another type of barcode. |
| priceSupported | "True" if price is supported within the barcode format, "false" otherwise. |
| price | The price found in the barcode. This should be the exact value parsed from the barcode without any formatting. |
| gs1CodeValueMap | The map (i.e., an object that maps keys to values) containing the GS1 information. The key is the GS1 application identifier ("AI") code and the value is the information parsed out for that code. |

After the first method is finished and the BarcodeRecord object is used to look up items, if any items are found, the second method is called, passing the item found and the original BarcodeRecord for additional processing. The second method uses the information in the BarcodeRecord to look up and assign appropriate values to a BarcodeItem object. This object represents the item found and some basic additional information from the barcode, and its value is returned by services to the client that supplied the scan. Example attributes of a BarcodeItem object are shown in Table 5. The second method is used for setting price, universal identification number ("UIN"), and quantity on the BarcodeItem through appropriate business rules or algorithms. The BarcodeItem object includes the associated StockItem (i.e., Stock Keeping Unit ("SKU") that includes item information and associated inventory positions, basically the "found" item).

TABLE 5

Example attributes of a BarcodeItem object

| Attribute | Description |
|---|---|
| stockItem | Populated by the inventory management system based on the item identifier ("ID") returned in the BarcodeRecord. |
| price | The price found on the barcode. This attribute is an object. The second method is responsible for converting it from the string price in BarcodeItem. The default value is "Null." |
| quantity | Default value is "1." |
| uin | Default value is "Null." |

Figure 2:
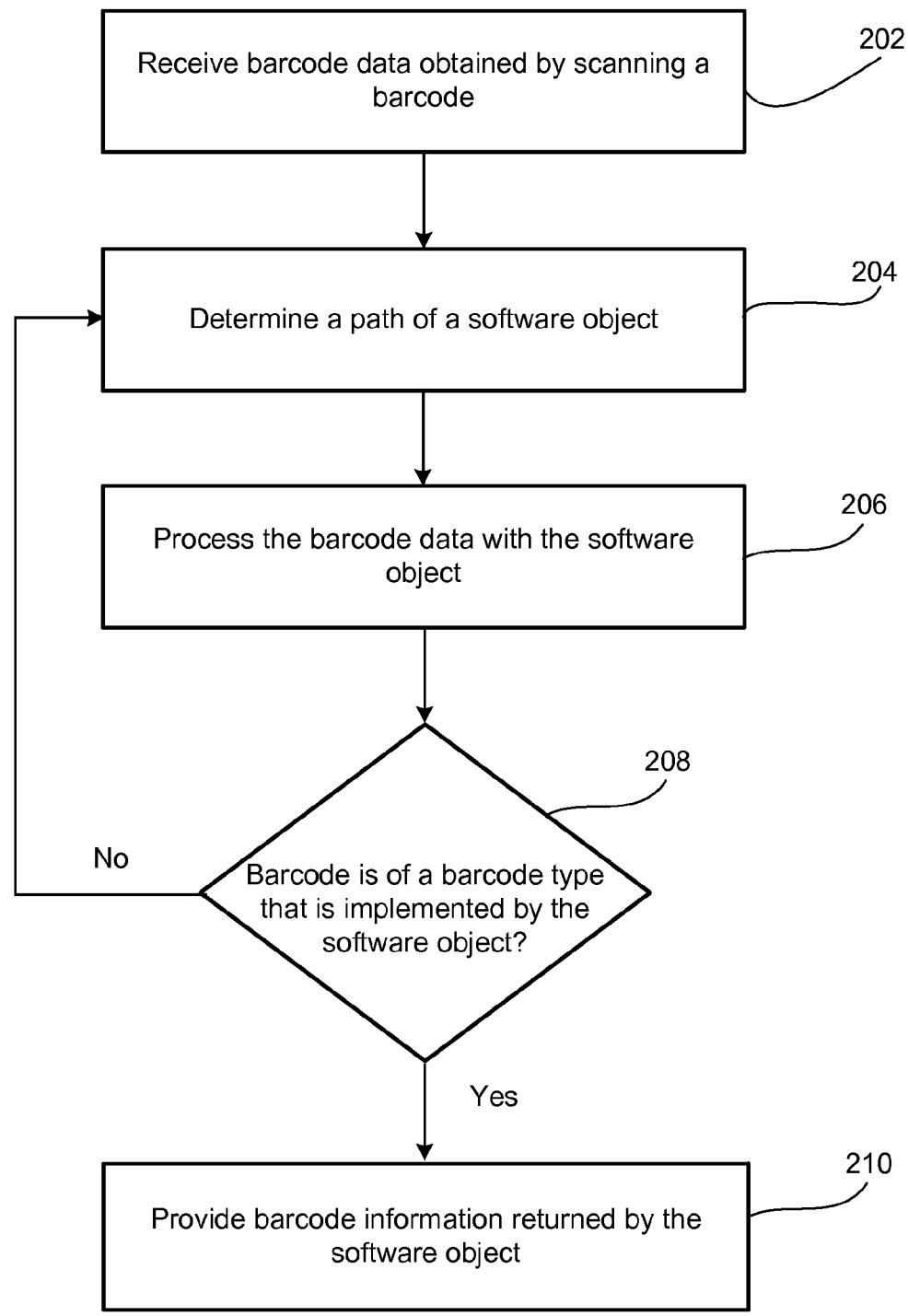
FIG. 2 is a flow diagram of the operation of the barcode processing module of FIG. 1 when processing barcodes in accordance with embodiments of the present invention.

FIG. 2 shows a flow diagram 200 of the operation of the barcode processing module 16 of FIG. 1 when processing barcodes in accordance with embodiments of the present invention. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, barcode processing module 16 receives barcode data obtained by scanning a barcode. For example, scanner 32 of FIG. 1 may be used to scan a barcode of an item. The scanned data is then converted to a string of numbers and provided to barcode processing module 16 as barcode data.

At 204, barcode processing module 16 determines a path of a software object. For example, barcode processing module 16 may retrieve a path of a software object from barcode processor table 34 stored in database 17 of FIG. 1. Barcode processor table 34 includes paths (e.g., Java class paths) to one or more software objects (e.g., Java classes) implementing different barcode types. Alternatively, when cached information of such path is available (e.g., when such path information has been previously retrieved and cached), barcode processing module 16 may use the cached information.

At 206, the retrieved object processes the barcode data. For example, barcode data is provided as an input parameter to a retrieved Java class which then returns corresponding outputs.

At 208, based on the output in 206, it is determined whether the barcode is of a barcode type that is implemented by the software object. For example, a Java class may return several attributes of a barcode if the barcode is of a type that is implemented by that Java class. Accordingly, the values returned by the Java class indicate whether the barcode is of a type that is implemented by that Java class.

At 210, relevant barcode information is returned to the application that provided the barcode data if it is determined that the barcode is of a barcode type that is implemented by the software object (i.e., a correct object type has been retrieved and used).

However, if it is determined that the barcode is not of a barcode type that is implemented by the software object (i.e., an incorrect object type has been retrieved), 240, 206, and 208 are repeated to try other software objects for processing the barcode data.

In one embodiment, when a retailer has specific needs for a barcode type the table may be updated with new rows corresponding to new software objects implementing new barcode types. Further, if some barcode types are not used by a retailer, corresponding rows in the table may be indicated as inactive so that the irrelevant barcode types are skipped during barcode processing.

As disclosed, embodiments implement barcode types via software objects, and examine those objects by accessing a table that stores the path to each object. Further, embodiments allow an object to be indicated as active or inactive based on usage, and define execution priorities for the objects. Accordingly, by allowing a barcode processing application to be configured to add or remove special algorithms and run various algorithms based on priority, embodiments improve performance and flexibility and reduce scanning response time of a barcode processing application.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to perform barcode processing, the barcode processing comprising:

receiving barcode data corresponding to an item obtained by scanning a barcode, wherein the barcode comprises embedded product information for the item;

determining a path of a software object out of a plurality of candidate paths of software objects, each software object implementing a different barcode processing algorithm and comprising a state and a behavior;

processing the barcode data with the software object, the processing comprising providing the embedded product information as an input to the software object and returning a corresponding output; and determining whether the barcode is of a barcode type that is implemented by the software object based on the output;

wherein the determining the path comprises accessing a table that defines available barcode processing algorithms and comprises a priority sequence of candidate paths column that determines an order in which candidate barcode processing algorithms are executed.

2. The computer-readable medium of claim 1, wherein the barcode processing further comprises:

when the barcode is not of the barcode type implemented by the software object, repeating the determining of the path, the processing of the barcode data, and the determining of whether the barcode is of the barcode type implemented by the software object based on the order.

3. The computer-readable medium of claim 1, wherein the barcode processing further comprises:

providing barcode information returned by the software object when the barcode is of the barcode type that is implemented by the software object.

4. The computer-readable medium of claim 1, wherein the determining of the path is performed by retrieving the path from a stored table or by using cached data of the path, wherein the table includes paths to one or more software objects implementing different barcode types.

5. The computer-readable medium of claim 4, wherein the retrieving is performed when the software object is indicated as active in the table, wherein each software object in the table is indicated as active or inactive based on a relative usage of a corresponding barcode type in an inventory management system.

6. The computer-readable medium of claim 4, wherein the barcode processing further comprises:

determining a new software object configured to implement a new barcode type;

adding a row in the table for the new software object, wherein the row includes a new path for the new software object;

placing the new software object in the new path of a deployed server; and restarting the server.

7. The computer-readable medium of claim 4, wherein the barcode processing further comprises:

determining that the software object needs an update;

indicating the software object as inactive in the table;

determining a new software object to implement the updates;

adding a row in the table for the new software object, wherein the row includes a new path for the new software object;

placing the new software object in the new path of a deployed server; and restarting the server.

8. The computer-readable medium of claim 1, wherein each software object comprises a Java class and each path comprises a Java class path, the processing comprising a first Java method that parses out the barcode data and fills in the appropriate values in the software object, and a second Java method that, after using the software object to find additional items, passes the items for additional processing.

9. A method of barcode processing comprising:

receiving barcode data corresponding to an item obtained by scanning a barcode, wherein the barcode comprises embedded product information for the item;

determining a path of a software object out of a plurality of candidate paths of software objects, each software object implementing a different barcode processing algorithm and comprising a state and a behavior;

processing the barcode data with the software object, the processing comprising providing the embedded product information as an input to the software object and returning a corresponding output; and determining whether the barcode is of a barcode type that is implemented by the software object based on the output;

wherein the determining the path comprises accessing a table that defines available barcode processing algorithms and comprises a priority sequence of candidate paths column that determines an order in which candidate barcode processing algorithms are executed.

10. The method of claim 9, further comprising:

when the barcode is not of the barcode type implemented by the software object, repeating the determining of the path, the processing of the barcode data, and the determining of whether the barcode is of the barcode type implemented by the software object based on the order.

11. The method of claim 9, further comprising:

providing barcode information returned by the software object when the barcode is of the barcode type that is implemented by the software object.

12. The method of claim 9, wherein the determining of the path is performed by retrieving the path from a stored table or by using cached data of the path, wherein the table includes paths to one or more software objects implementing different barcode types.

13. The method of claim 12, wherein the retrieving is performed when the software object is indicated as active in the table, wherein each software object in the table is indicated as active or inactive based on a relative usage of a corresponding barcode type in an inventory management system.

14. The method of claim 12, further comprising:

determining a new software object configured to implement a new barcode type;

adding a row in the table for the new software object, wherein the row includes a new path for the new software object;

placing the new software object in the new path of a deployed server; and restarting the server.

15. The method of claim 12, further comprising:

determining that the software object needs an update;

indicating the software object as inactive in the table;

determining a new software object to implement the updates;

adding a row in the table for the new software object, wherein the row includes a new path for the new software object;

placing the new software object in the new path of a deployed server; and restarting the server.

16. The method of claim 9, wherein each software object comprises a Java class and each path comprises a Java class path, the processing comprising a first Java method that parses out the barcode data and fills in the appropriate values in the software object, and a second Java method that, after using the software object to find additional items, passes the items for additional processing.

17. A barcode processing system comprising:
- a receiving module that receives barcode data corresponding to an item obtained by scanning a barcode, wherein the barcode comprises embedded product information for the item;
- a determining module that determines a path of a software object out of a plurality of candidate paths of software objects, each software object implementing a different barcode processing algorithm and comprising a state and a behavior;
- a processing module that processes the barcode data with the software object, the processing comprising providing the embedded product information as an input to the software object and returning a corresponding output; and
- the determining module further determining whether the barcode is of a barcode type that is implemented by the software object based on the output;
- wherein the determining the path comprises accessing a table that defines available barcode processing algorithms and comprises a priority sequence of candidate paths column that determines an order in which candidate barcode processing algorithms are executed.

18. The system of claim 17, further comprising:
- a repeating module that when the barcode is not of the barcode type implemented by the software object, repeats the determining of the path, the processing of the barcode data, and the determining of whether the barcode is of the barcode type implemented by the software object based on the order.

19. The system of claim 17, further comprising:
- a providing module that provides barcode information returned by the software object when the barcode is of the barcode type that is implemented by the software object.

20. The system of claim 19, wherein the determining of the path is performed by retrieving the path from a stored table or by using cached data of the path, wherein the table includes paths to one or more software objects implementing different barcode types.

* * * * *